United States Patent [19]
Win et al.

[11] Patent Number: 5,667,635
[45] Date of Patent: Sep. 16, 1997

[54] FLUSHABLE PREMOISTENED PERSONAL WIPE

[75] Inventors: Maug Hla Win, Neenah; Mark Alan Burazin, Appleton; Steven Alexander Engel, Neenah; Bernhardt Edward Kressner, Appleton; William Dee Lloyd, Appleton; Walter Theodore Schultz, Appleton, all of Wis.

[73] Assignee: Kimberly-Clark Worldwide, Inc., Neenah, Wis.

[21] Appl. No.: 715,666

[22] Filed: Sep. 18, 1996

[51] Int. Cl.⁶ .................................................. D21H 11/00
[52] U.S. Cl. ........................ 162/109; 162/158; 162/164.1; 162/166
[58] Field of Search ............................. 162/109, 158, 162/164.1, 166

[56] References Cited

U.S. PATENT DOCUMENTS

| | | | |
|---|---|---|---|
| 3,432,936 | 3/1969 | Cole et al. | 34/6 |
| 3,700,623 | 10/1972 | Keim | 260/80.3 R |
| 3,772,076 | 11/1973 | Keim | 117/155 R |
| 3,798,120 | 3/1974 | Enloe et al. | 162/112 |
| 3,855,158 | 12/1974 | Petrovich et al. | 260/2 BP |
| 3,899,388 | 8/1975 | Petrovich et al. | 162/164 |
| 4,117,187 | 9/1978 | Adams et al. | 428/286 |
| 4,129,528 | 12/1978 | Petrovich et al. | 260/823 |
| 4,147,586 | 4/1979 | Petrovich et al. | 162/135 |
| 4,164,595 | 8/1979 | Adams et al. | 427/341 |
| 4,222,921 | 9/1980 | Van Eenam | 260/29.6 H |
| 4,245,744 | 1/1981 | Daniels et al. | 206/812 |
| 4,258,849 | 3/1981 | Miller | 206/812 |
| 4,309,469 | 1/1982 | Varons | 428/74 |
| 4,343,133 | 8/1982 | Daniels et al. | 53/431 |
| 4,343,134 | 8/1982 | Davidowich et al. | 53/431 |
| 4,343,403 | 8/1982 | Daniels et al. | 206/812 |
| 4,362,781 | 12/1982 | Anderson | 428/291 |
| 4,786,367 | 11/1988 | Bogart et al. | 162/158 |
| 4,882,221 | 11/1989 | Bogart et al. | 428/306.8 |
| 4,883,475 | 11/1989 | Bogart et al. | 604/290 |
| 4,904,524 | 2/1990 | Yoh | 428/311.3 |
| 5,026,363 | 6/1991 | Pratt | 604/385.1 |
| 5,124,197 | 6/1992 | Bernardin et al. | 428/284 |
| 5,129,988 | 7/1992 | Farrington, Jr. | 162/123 |
| 5,281,306 | 1/1994 | Kakiuchi et al. | 162/158 |
| 5,300,358 | 4/1994 | Evers | 428/286 |

*Primary Examiner*—Christopher Raimund
*Attorney, Agent, or Firm*—Gregory E. Croft

[57] ABSTRACT

A pre-moistened wet wipe provides functional wet strength in use, yet is dispersible if flushed down the toilet so that plumbing and sewage treatment facilities do not become clogged. A particular embodiment of the wipe consists of three uncreped through-air-dried tissue plies that are attached to each other by edge embossing. The two outer plies contain a wet strength agent to provide wet poke-through resistance to two large, centrally-located unembossed regions. The center ply contains no wet strength agent to aid in dispersibility. The embossing around the edges of the wipe further degrades the strength of the wipe in the embossed areas to assist in dispersibility when the wipe is flushed.

10 Claims, 6 Drawing Sheets

FLUSHABLE PREMOISTENED PERSONAL WIPE

BACKGROUND OF THE INVENTION

It is well known that wet wipes provide excellent cleaning. They are used extensively for babies and also find a variety of uses for other purposes. In the infant care area, such wet wipes are made of nonwoven synthetic fibers, such as polypropylene, which are unaffected by the water content in the wipe. Hence these products can be stored and used without concern about the wet strength of the wipe. Unfortunately, this desireable characteristic is also a detriment, since these wipes cannot be safely disposed by flushing them down the toilet. While nonwoven wipes may pass through the plumbing within in the home, they are apt to clog service lateral pipes that have been penetrated by roots. If they pass through the service laterals, such wipes may also clog sewage treatment facilities by hanging up on the closely-space cross bars that serve to filter out solid waste entering the facilities.

Consequently, for in-home use and in public restrooms, dry bath tissue remains the only viable product. While readily dispersible, dry bath tissues do not possess the cleaning ability of wet wipes. Therefore there is a need for a wet wipe product that possess adequate dispersibility so that it may be safely disposed of by flushing down the toilet.

SUMMARY OF THE INVENTION

It has now been discovered that a wet wipe can be made that has sufficient wet strength and integrity while wet to be packaged and stored while wet, yet has sufficient water dispersibility to break up into sufficiently small pieces when flushed down the toilet after use so as not to clog plumbing and sewage treatment facilities. This is accomplished by incorporating several different features into the wet wipe such that a proper balance of properties is attained. First, multiple plies or sheets are brought together because multiple, low basis weight sheets will disperse more readily than a single, heavy basis weight sheet. Second, a wet strength agent is incorporated into the sheets to provide wet integrity during storage and in use. Third, uncreped through-air-dried sheets of papermaking fibers are used because these sheets possess high bulk when wet and thereby offer better cleaning. In combination with the wet strength agent, these sheets possess high poke-through resistance in use. Fourth, the multiple plies are attached together by mechanical embossing, at least around the edges of the wipe, in order provide integrity during storage and in use. At the same time, the embossing also weakens the sheets in the embossed areas to promote breakup during flushing and subsequent travel in the sewage system. Consequently the wipe is preferably embossed wherever poke-through strength is not needed. By leaving one or more relatively large unembossed regions in the central portions of the wipe where the user's fingers are most likely to put pressure for poking through, improved dispersibility is attained while preserving the functional strength needed to perform in use.

Hence in one aspect the invention resides in a water-dispersible wet wipe comprising at least two uncreped through-air-dried tissue sheets of papermaking fibers containing a wet strength agent and mechanically-attached together along their edges by embossments sufficient to maintain the integrity of the wet wipe during use, said wipe having one or more centrally-located unembossed regions having an area of from about 1 to about 30 square inches, a moisture content of at least about 200 weight percent based on the weight of fiber, a Wet Burst Strength of about 100 grams or greater in the centrally-located unembossed regions, and a Dispersibility of from about 10 to about 100 percent.

Suitable uncreped through-air-dried tissue sheets can be made as described in co-pending application Ser. No. 08/614,420 filed Mar. 8, 1996 in the names of F. J. Chen et al. entitled "Wet-Resilient Webs and Disposable Articles Made Therewith", herein incorporated by reference, and will be further described herein in connection with the Drawing. These sheets can have a basis weight of from about 10 to about 200 grams per square meter (gsm) per ply, more specifically from about 20 to about 70 gsm per ply. The basis weight of each sheet will depend in part on the number of plies. As the number of plies increases, the basis weight of each ply can decrease. As examples, for a two-ply product, a suitable basis weight can be about 45 gsm per ply. For a three-ply product, a suitable basis weight can be about 25 gsm per ply. For a four-ply product, a suitable basis weight can be about 20 gsm per ply.

There are a number of materials commonly used in the paper industry to impart wet strength to paper and board that are applicable to this invention. These materials are known in the art as wet strength agents and are commercially available from a wide variety of sources. Any material that when added to a paper or tissue results in providing a tissue or paper with a wet strength:dry strength ratio in excess of 0.1 will, for purposes of this invention, be termed a wet strength agent. Typically these materials are termed either as permanent wet strength agents or as "temporary" wet strength agents. For the purposes of differentiating permanent from temporary wet strength, permanent will be defined as those resins which, when incorporated into paper or tissue products, will provide a product that retains more than 50% of its original wet strength after exposure to water for a period of at least five minutes. Temporary wet strength agents are those which show less than 50% of their original wet strength after exposure to water for five minutes. Both classes of material find application in the present invention. The amount of wet strength agent added to the pulp fibers can be at least about 0.1 dry weight percent, more specifically about 0.2 dry weight percent or greater, and still more specifically from about 0.1 to about 3 dry weight percent based on the dry weight of the fibers.

Permanent wet strength agents will provide a more or less long-term wet resilience to the structure. This type of structure would find application in products that would require long-term wet resilience such as in paper towels and in many absorbent consumer products. In contrast, the temporary wet strength agents would provide structures that had low density and high resilience, but would not provide a structure that had long-term resistance to exposure to water or body fluids. While the structure would have good integrity initially, after a period of time the structure would begin to lose its wet resilience. This property can be used to some advantage in providing materials that are highly absorbent when initially wet, but which after a period of time lose their integrity. This property could be used in providing "flushable" products. The mechanism by which the wet strength is generated has little influence on the products of this invention as long as the essential property of generating water-resistant bonding at the fiber/fiber bond points is obtained.

The permanent wet strength agents that are of utility in the present invention are typically water soluble, cationic oligomeric or polymeric resins that are capable of either crosslinking with themselves (homocrosslinking) or with the cellulose or other constituent of the wood fiber. The most widely-used materials for this purpose are the class of polymer known as polyamide-polyamine-epichlorohydrin (PAE) type resins. These materials have been described in patents issued to Keim (U.S. Pat. Nos. 3,700,623 and 3,772,076) and are sold by Hercules, Inc., Wilmington, Del., as Kymene 557H. Related materials are marketed by Henkel Chemical Co., Charlotte, N.C. and Georgia-Pacific Resins, Inc., Atlanta, Ga.

Polyamide-epichlorohydrin resins are also useful as bonding resins in this invention. Materials developed by Monsanto and marketed under the Santo Res label are base-activated polyamide-epichlorohydrin resins that can be used in the present invention. These materials are described in patents issued to Petrovich (U.S. Pat. No. 3,855,158; U.S. Pat. No. 3,899,388; U.S. Pat. No. 4,129,528 and U.S. Pat. No. 4,147,586) and van Eenam (U.S. Pat. No. 4,222,921). Although they are not as commonly used in consumer products, polyethylenimine resins are also suitable for immobilizing the bond points in the products of this invention. Another class of permanent-type wet strength agents are exemplified by the aminoplast resins obtained by reaction of formaldehyde with melamine or urea.

The amount of wet strength agent added to the uncreped through-air-dried sheet can be from about 1 to about 15 kilograms per metric ton of fiber, more specifically from about 2 to about 10 kilograms per metric ton. The amount will depend, among other things, on the basis weight of the sheet and the types of fibers in the sheet.

The amount of liquid in the wet wipes of this invention, based on the dry weight of the wipe, can be at least about 100 percent weight percent, more specifically from about 100 to about 700 weight percent, and still more specifically from about 250 to about 550 weight percent. In general, there must be sufficient liquid to enhance cleaning, but preferably not so much as to drip when in use. The composition of the liquid within the wipes can be any adequately preserved aqueous surfactant solution, including solutions commonly used in currently commercially available wet wipes.

For purposes herein, the Wet Burst Strength is determined by using a tensile tester to measure the force necessary to cause the sample to burst or tear. In general, the test sample is secured and suspended horizontally. A foot descends onto the sample until it tears. The instrument records the peak load required to tear the sample. An average peak load for a representative number of samples is the Wet Burst Strength.

The Wet Burst Strength of the unembossed regions of the wet wipes of this invention can be about 100 grams or greater, more specifically from about 100 to about 200 grams or greater, and still more specifically from about 110 to about 140 grams or greater.

As used herein, the Dispersibility is the histogram area-percent of fragments smaller than 2.2 centimeters equivalent circular diameter, taken at the 80-minute level of agitation, as determined in the test method described below in connection with FIGS. 4 and 5. The Dispersibility of the wet wipes of this invention can be from about 10 to 100 percent, more specifically from about 20 to about 100 percent, more specifically from about 40 to about 100 percent, more specifically from about 60 to 100 percent, still more specifically from about 80 to 100 percent and still more specifically from about 60 to about 85 percent.

DETAILED DESCRIPTION OF THE DRAWINGS

Figure 1:
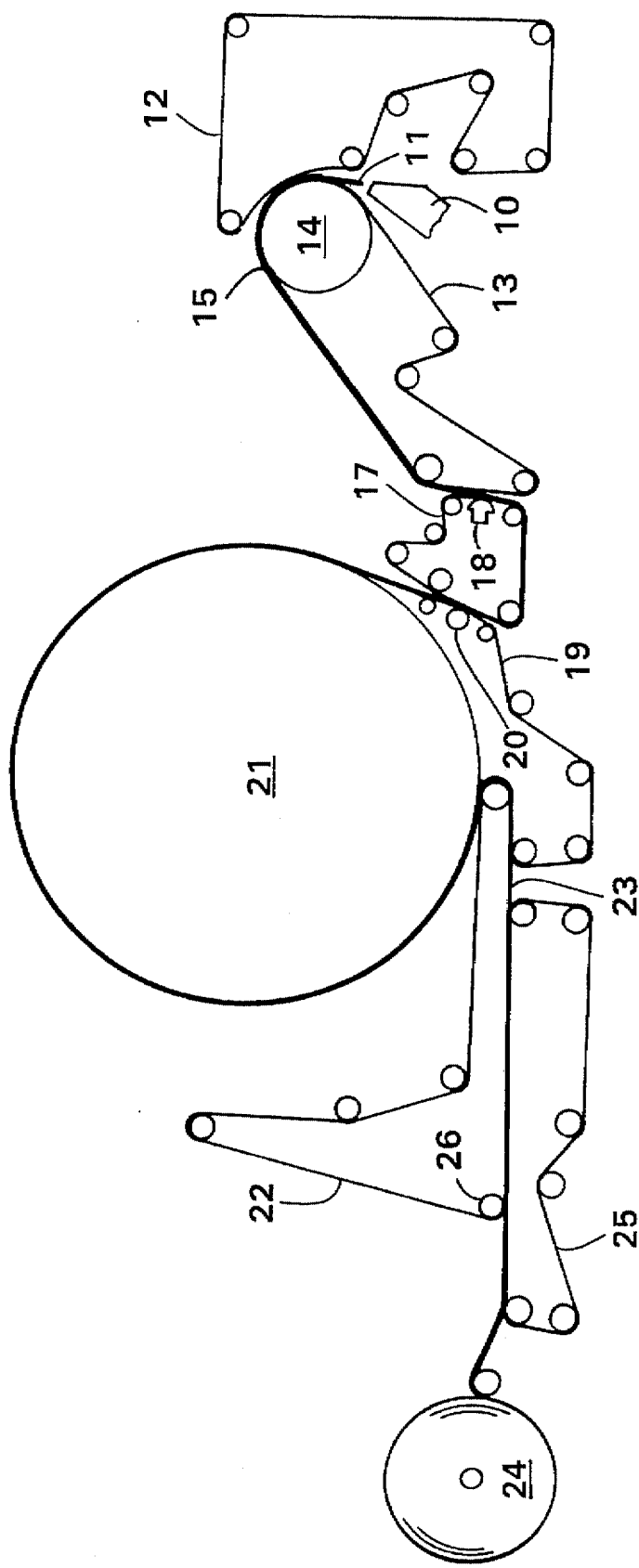
FIG. 1 is a schematic flow diagram of a method for making uncreped through-air-dried tissue sheets suitable for use in the products of this invention.

Referring to FIG. 1, shown is a method for making throughdried paper sheets in accordance with this invention. (For simplicity, the various tensioning rolls schematically used to define the several fabric runs are shown but not numbered. It will be appreciated that variations from the apparatus and method illustrated in FIG. 1 can be made without departing from the scope of the invention). Shown is a twin wire former having a layered papermaking headbox 10 which injects or deposits a stream 11 of an aqueous suspension of papermaking fibers onto the forming fabric 13 which serves to support and carry the newly-formed wet web downstream in the process as the web is partially dewatered to a consistency of about 10 dry weight percent. Additional dewatering of the wet web can be carried out, such as by vacuum suction, while the wet web is supported by the forming fabric.

The wet web is then transferred from the forming fabric to a transfer fabric 17 traveling at a slower speed than the forming fabric in order to impart increased stretch into the web. Transfer is preferably carried out with the assistance of a vacuum shoe 18 and a fixed gap or space between the forming fabric and the transfer fabric or a kiss transfer to avoid compression of the wet web.

The web is then transferred from the transfer fabric to the throughdrying fabric 19 with the aid of a vacuum transfer roll 20 or a vacuum transfer shoe, optionally again using a fixed gap transfer as previously described. The throughdrying fabric can be traveling at about the same speed or a different speed relative to the transfer fabric. If desired, the throughdrying fabric can be run at a slower speed to further enhance stretch. Transfer is preferably carried out with vacuum assistance to ensure deformation of the sheet to conform to the throughdrying fabric, thus yielding desired bulk and appearance.

The level of vacuum used for the web transfers can be from about 3 to about 15 inches of mercury (75 to about 380 millimeters of mercury), preferably about 5 inches (125 millimeters) of mercury. The vacuum shoe (negative pressure) can be supplemented or replaced by the use of positive pressure from the opposite side of the web to blow the web onto the next fabric in addition to or as a replacement for sucking it onto the next fabric with vacuum. Also, a vacuum roll or rolls can be used to replace the vacuum shoe(s).

While supported by the throughdrying fabric, the web is final dried to a consistency of about 94 percent or greater by the throughdryer 21 and thereafter transferred to a carrier fabric 22. The dried basesheet 23 is transported to the reel 24 using carrier fabric 22 and an optional carrier fabric 25. An optional pressurized turning roll 26 can be used to facilitate transfer of the web from carrier fabric 22 to fabric 25. Suitable carrier fabrics for this purpose are Albany International 84M or 94M and Asten 959 or 937, all of which are relatively smooth fabrics having a fine pattern.

Figure 2:
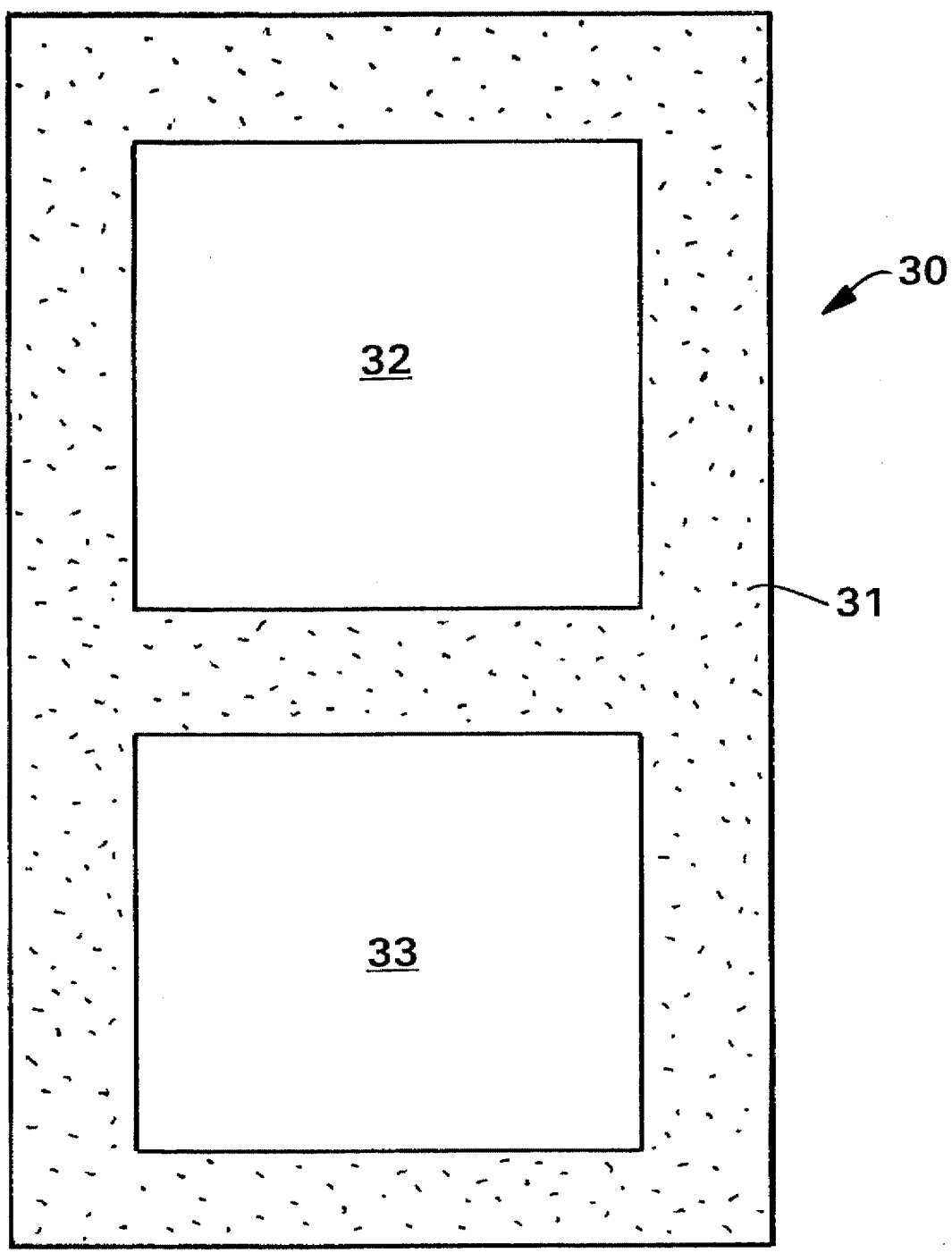
FIG. 2 is a schematic plan view of a wet wipe of this invention, illustrating a suitable embossing pattern.

FIG. 2 is a schematic plan view of a wet wipe in accordance with this invention. Shown is a wet wipe 30 having an embossed region 31 and two unembossed regions 32 and 33 essentially surrounded by the embossed region. As shown, the embossed region contains a plurality of individual embossments which comprise an embossing pattern of closely-spaced dots. These embossments serve to attach the plies of the wet wipe together along their edges to provide integrity to the multi-ply wipe in storage and in use. It is believed to be particularly important that the edges of the various plies be sufficiently attached to each other so that the user does not inadvertently separate them as the wipe is withdrawn from its container or package. To do so, it is preferred, and in some cases necessary, that embossing be carried out in such a manner as to perforate the individual plies. This method of embossing is sometimes referred to as "perf embossing" and provides stronger ply-to-ply attachment than ordinary embossing. Embossing of the plies can be carried out prior to wetting of the sheets or after.

While many embossing patterns can be used to attach the plies together, the embossing pattern used for HI-DRY® kitchen towels, manufactured by Kimberly-Clark Corporation, works very well. This embossing pattern consists of a multiplicity of dots, approximately 0.050 inch in diameter, spaced apart by about 5/32 inch. However, any embossing pattern that provides ply attachment and degrades the strength of the sheet in the embossed area sufficient to enhance dispersibility can be used.

As illustrated in FIG. 2, there are two relatively large unembossed regions. These are the regions of the wet wipe most likely to receive finger pressure during use and therefore are stronger, as measured by the Wet Burst Strength, than the surrounding weakened embossed area. A typical wipe can be approximately 5 inches by 7 inches in size. For the embodiment shown in FIG. 2, each of the unembossed areas are about 10 square inches in area. In use, the user can fold the wet wipe over upon itself such that the two unembossed areas overlay each other, thereby doubling the Wet Burst strength of the wipe to prevent poke through.

While having two relatively large unembossed regions is preferred as illustrated in FIG. 2, other unembossed configurations can also be utilized. The unembossed regions can be any size or shape, provided they have sufficient area to protect the user's hand/fingers during use. In addition, it is possible to provide lines of weakness within the unembossed regions to promote breakup during flushing or travel within the sewage system. It is highly desireable to have the wet wipe break up into pieces sufficiently small to pass through the sewage treatment facility without difficulty. Since the wipe is preferably entirely or substantially made of cellulosic fibers, it is readily biodegradable so there are no long term disposal concerns.

Figure 3:
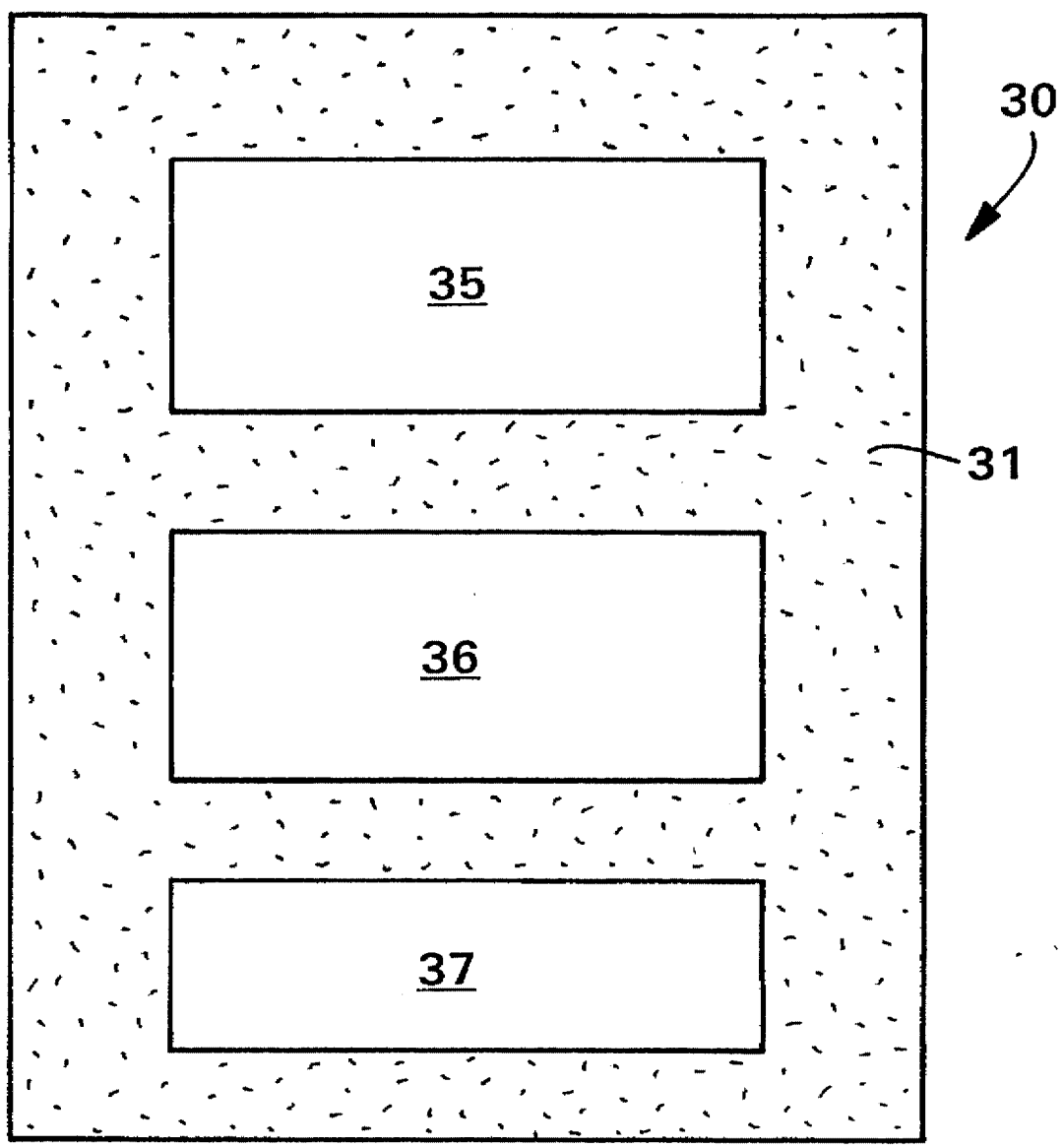
FIG. 3 is a schematic plan view of a wet wipe of this invention, illustrating another suitable embossing pattern.

FIG. 3 is a schematic plan view of another embodiment of a wet wipe in accordance with this invention similar to that illustrated in FIG. 2, but having three unembossed regions 35, 36 and 37. As the number of unembossed regions increases, the size of the unembossed regions decreases, thereby offering the potential to improve break-up of the wipe in the sewer system.

Figure 4:
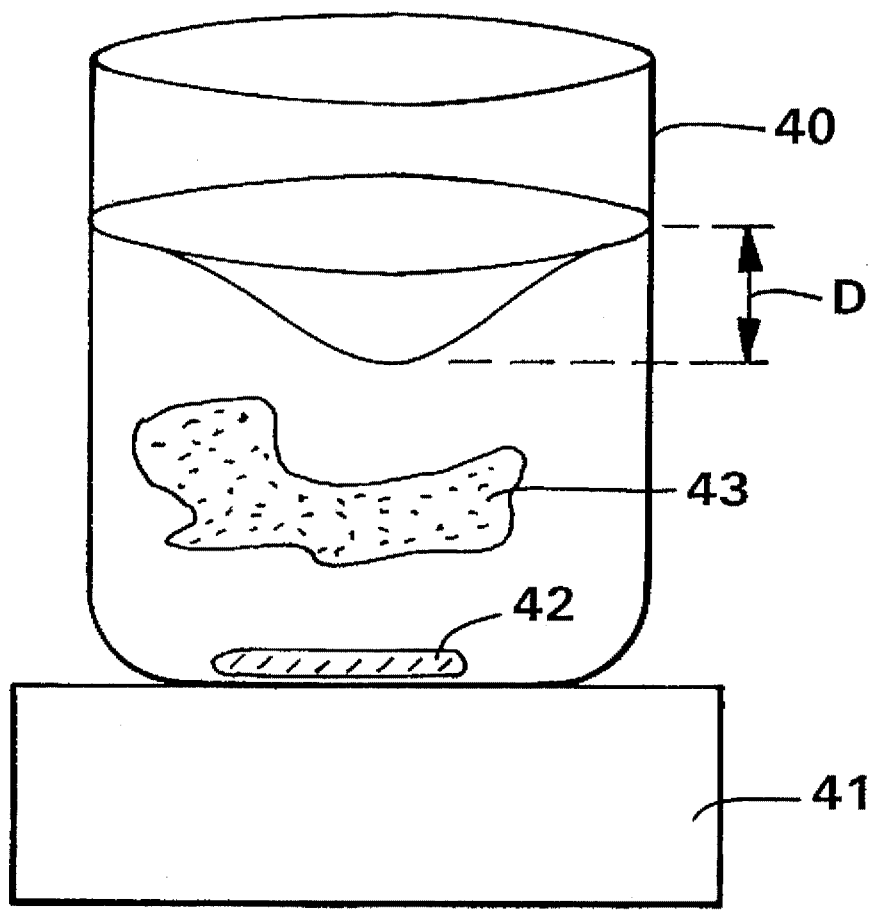
FIG. 4 is a schematic view of the set-up for dispersing a sample to measure Dispersibility.
Figure 5:
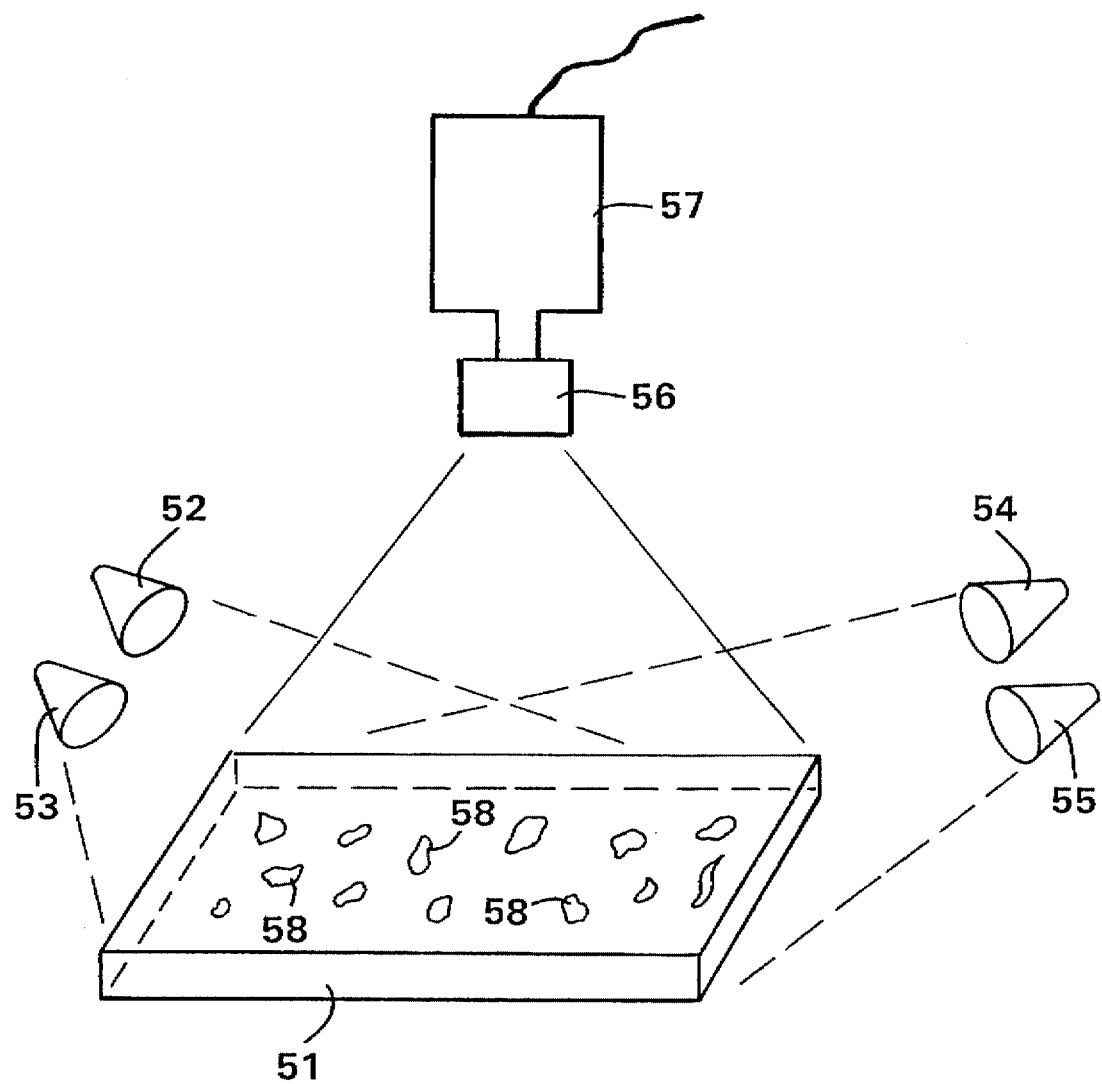
FIG. 5 is a schematic view of the optical measurement set-up for measuring the particle size distribution of a dispersed sample.

Referring now to FIGS. 4 and 5, the method for determining the Dispersibility will be described. A 1500-milliliter glass beaker 40 is placed on a Nuova II magnetic stir plate 41 and filled with 1000 milliliters of distilled water. A 3-inches long magnetic stir bar 42 is placed in the bottom of the beaker. The sample 43 to be tested, measuring 5 inches by 7 inches, is placed in the beaker and stirred rapidly to produce a 2-inches deep vortex, illustrated by distance "D" in FIG. 4. The stirring periods are 5, 10, 20, 40, and 80 minutes, separated by measurements as described below. If the sample becomes hung up on the stir bar, the time is stopped, the sample freed, and the time is resumed.

Referring to FIG. 5, the contents of the beaker are periodically decanted into a 12 inches by 16 inches by 3 inches high clear Plexiglass® tray 51, which is placed on a black photodrape background on the table of a Kreonite® macroviewer with a 60 inches long pole (G. Kelly, Darien, Ill.). The fragments sample are illuminated by four low-angle incident flood lamps 52, 53, 54 and 55. The fragments are imaged with a 20 mm. nikon lens 56 attached to a Chalnicon scanner 57 and a Leica Quantimet 970 Image Analysis System (Leica Corp., Deerfield, Ill.). The sample fragments 58 are "teased" apart to avoid touching and the routine "WALLY1" (described below) is run to perform the analysis, which provides a histogram of the sample fragment size. The tray contents are then poured back into the beaker and the agitation is continued. In this manner samples are taken and measured for each of the stirring periods to determine the extent to which the sample breaks apart as a function of the stirring time.

The routine "WALLY1" is as follows:
Cambridge Instruments QUANTIMET 970 QUIPS/MX: V08 USER: ROUTINE: WALLY1 DATE: 25 Apr. 1996 RUN: 0 SPECIMEN:

Enter specimen identity

Scanner (No. 1 Chalnicon LV=1.96 SENS=2.83 PAUSE)

Load Shading Corrector (pattern—BONDPA)

Calibrate User Specified (Cal Value=0.05773 centimeters per pixel)

SUBRTN STANDARD

Scanner (No. 1 Chalnicon LV=1.96 SENS=2.83 PAUSE)

Image Frame (Pause) is Rectangle ( X: 88, Y: 94, W: 681, H: 516, )

Live Frame is Standard Live Frame

Detect 2D (Lighter than 12, Delin PAUSE )

Amend (Open by 1 )

Edit (pause) EDIT

Measure feature AREA X.FCP Y.FCP with limits 0.250 (=AREA ( 1666. into array FEATURE ( of 1000 features and 5 parameters )

FEATURE CALC :=( ( 4. * AREA / PI ) 0.50000 )

Distribution of COUNT v AREA (Units SQ CM ) from FEATURE in HIST01 from 0.250 to 250.0 in 15 bins (LOG)

Print ""

Print ""

Print Distribution ( HIST01, differential, bar chart, scale= 0.00)

Print ""

Print ""

Print Distribution ( HIST02, -cumulative, bar chart, scale=0.00)

END OF PROGRAM

From the histogram printed from the last line of the WALLY1 routine, "Dispersibility" is the area-percent of fragments smaller that 2.2 centimeters based on equivalent circular diameter (square root of (4 times the area divided by "pi"), taken at the 80-minute level of agitation.

Figure 6:
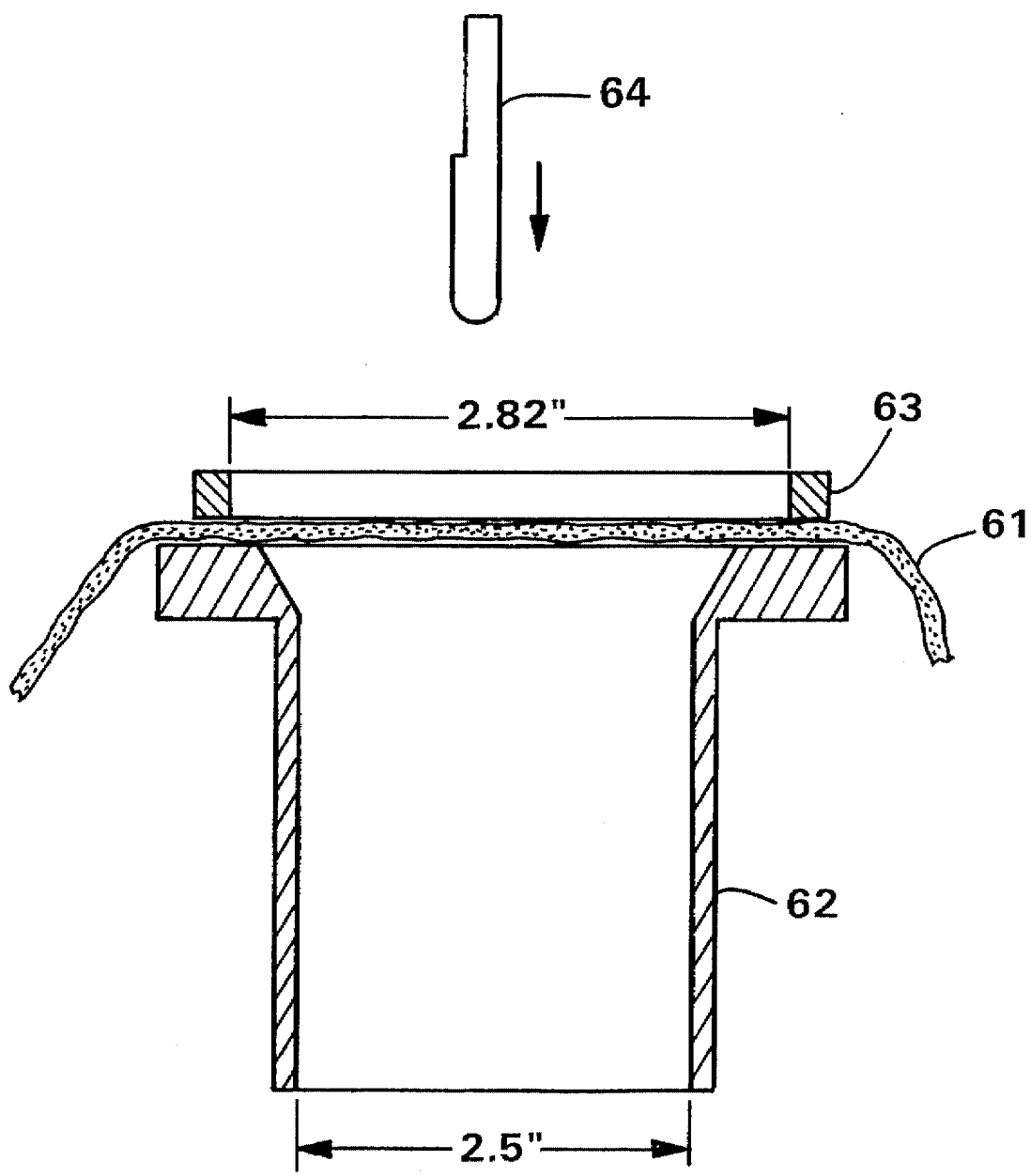
FIG. 6 is a schematic representation of the apparatus used to measure the Wet Burst Strength.

FIG. 6 is a schematic cross-sectional view of the apparatus used to measure the Wet Burst Strength. Shown is the sample web 61 to be tested, a hollow cylindrical metal sample stand 62, a magnetic ring 63 that secures the sample to the sample stand, and a contact foot or probe 64 mounted to the crosshead of the tensile tester (not shown).

The tensile tester is equipped with a computerized data-acquisition system that is capable of calculating peak load and energy between two predetermined distances (15–60 millimeters). The load cell should be chosen so that the peak load values fall between 10 and 90 percent of the full-scale load for the material being tested. Suitable tensile testers are available from Instron Corporation, Canton, Mass. 02021 and Sintech, Inc., Research Triangle Park, N.C. 27709-4226.

The test is carried out in a standard laboratory atmosphere of about 23° C. and about 50 percent relative humidity. The test instrument should be mounted on a table free of vibrations to avoid ending the test prematurely. The sample is draped across the opening of the sample stand and secured with the magnetic ring. The inside diameter of the sample stand is 2.5 inches and the inside diameter of the magnetic ring is 2.82 inches. The probe is aluminum and has a length of 4.5 inches, a diameter of 0.50 inch and a radius of curvature at the end of 0.25 inch. During the test, the probe is lowered onto the sample at a rate of 16 inches per minute until the sample tears. The peak load (grams) is the wet burst strength for the sample. A representative number of samples should be tested to obtain an average value, which is the Wet Burst Strength.

EXAMPLES

Example 1

A low density uncreped throughdried sheet was produced using wet resilient fibers (Tembec 525/80 spruce BCTMP) without a wet strength agent as illustrated in FIG. 1. More specifically, the fiber was pulped at about 2.9% consistency in the hydropulper for about 60 minutes. The fiber was pumped into a stock chest and diluted to about 1.0% consistency. A sheet of 26 gsm dry weight was formed on an Albany 94M forming fabric and dewatered with 9 inches (229 millimeters) of mercury vacuum. The forming fabric was traveling at 75 fpm (0.38 meters per second). The sheet was transferred at a 25% rush transfer to a Lindsay 952 -S05 transfer fabric traveling at 60 fpm (0.30 meters per second). The vacuum in the transfer between the forming fabric and transfer fabric was 9 inches (229 millimeters) of mercury.

The sheet was vacuum transferred at 11 inches (279 millimeters) of mercury to a throughdryer fabric (Lindsay T116-1) traveling at the same speed as the transfer fabric, 60 fpm (0.30 meters per second). The sheet and throughdryer fabric traveled over a fourth vacuum at 11 inches (279 millimeters) of mercury just prior to entering into a Honeycomb throughdryer operating at 291° F. (144° C.) and dried to a final dryness of 94–98% consistency.

A three-ply wet wipe was made from a center ply of the basesheet described above, and two outer plies of a basesheet made as above with the addition of 2 kg/mt Kymene 557 LX and 1 kg/mt of Parez 631NC. The three plies were cut into sheets approximately 10'×16" (3.1 m×41 cm) and were stacked on top of each other. The outer plies were oriented such that the sides of the outer plies which contacted the through-air-dried fabric were facing out. The three sheets were then fed by hand into the embossing nip, creating a three-ply dry wipe with the postage stamp pattern (FIG. 2). The outside region of this pattern has an embossing area ⅛" wide. An embossing area 9/16" wide runs through the center of the pattern in the CD direction. This pattern creates two unembossed areas 2¾"×3½". The embossing process is accomplished by using a matched female/male embossing roll with the male pattern engaged into the female pattern 0.050 inches. Depending upon the thickness of the sheet, this engagement will vary. Wipe sizes of 5"×7" were then cut from the embossed 7¾"×5¼" embossed sheets, placed in stacks and then wet-out using a solution of 98.4% distilled water, 1.0% Phospholipid PTC, 0.4% Germol 2, and 0.2 % sodium benzoate. A stack of 10 wipes was then placed into a plastic container and placed onto a scale and tared. Solution was then added using a small squeeze bottle at 330% of the dry stack weight. The plastic container was closed and samples placed in a refrigerated room until testing.

Examples 2–3 (This Invention)

Wet wipes having different basis weights were made as described in Example 1. A two-ply wet wipe was made with a basis weight of 44 gsm per ply (Example 2). A three-ply wet wipe was made having a basis weight of 22 gsm per ply (Example 3).

Example 2

In order to further illustrate this invention, an uncreped throughdried tissue was produced using the method substantially as illustrated in FIG. 1. More specifically, three-layered, single-ply tissue was made in which the outer layers comprised dispersed, debonded Cenibra eucalyptus fibers and the center layer comprised unrefined northern softwood bleached chemithermomechanical pulp (BCTMP) fibers.

Prior to formation, the eucalyptus fibers were pulped for 15 minutes at 10 percent consistency and dewatered to 30 percent consistency. The pulp was then fed to a Maule shaft disperser operated at 70° C. with a power input of 2.6 kilowatt-days per metric ton.

The BCTMP fibers were pulped for 20 minutes at 4.6 percent consistency and diluted to 2.8 percent consistency after pulping, while the dispersed, debonded eucalyptus fibers were diluted to 2 percent consistency. The overall layered sheet weight was split 12.5%/75%/12.5% among the dispersed eucalyptus/BCTMP/dispersed eucalyptus layers. Kymene 557 LX was added to the center layer at 6 kg/mt of pulp based on the center layer, and to the outer layers at 1.5 kg/mt of pulp based on the outer layer.

A four-layer headbox was used to form the wet web with the BCTMP stock in the two center layers of the headbox to produce a single center layer for the three-layered product described. Turbulence-generating inserts recessed about 75 millimeters from the slice, and layer dividers extending about 150 millimeters beyond the slice were employed. Flexible lip extensions extending about 150 millimeters beyond the slice were also used, as taught in U.S. Pat. No. 5,129,988 issued Jul. 4, 1992 to Farrington, Jr. et al. entitled "Extended Flexible Headbox Slice With Parallel Flexible Lip Extensions and Extended Internal Dividers", which is herein incorporated by reference. The net slice opening was about 23 millimeters and water flows in all four headbox layers were comparable. The consistency of the stock fed to the headbox was about 0.09 weight percent.

The resulting three-layered sheet was formed on a twin-wire, suction form roll, former with the forming fabric being Asten 866 fabric. The speed of the forming fabric was 10.6 meters per second. The newly-formed web was then dewatered to a consistency of about 20–27 percent using vacuum suction from below the forming fabric before being transferred to the transfer fabric, which was traveling at 8.1 meters per second (30% rush transfer). The transfer fabric was an Appleton Wire 94M. A vacuum shoe pulling about 150–380 millimeters of mercury vacuum was used to transfer the web to the transfer fabric.

The web was then transferred to a throughdrying fabric (Lindsay Wire T116-3). The throughdrying fabric was traveling at a speed of about 8.1 meters per second. The web was carried over a Honeycomb throughdryer operating at a temperature of about 200° C. and dried to final dryness of about 94–98 percent consistency.

Example 3

Uncreped throughdried tissue was produced using the method as described in Example 2, with the following exceptions. More specifically, two-layered, single-ply tissue was made in which the layer dried in contact with the through-air-dried fabric comprised dispersed, debonded Cenibra eucalyptus fibers and the other layer comprised BCTMP fibers. Kymene 557 LX was added to the BCTMP layer at 10 kilograms per metric ton of pulp based on the BCTMP layer and to the eucalyptus layer at 5 kg/mt. Additionally, Berocell 596 debonder was added to the eucalyptus layer (before the Kymene) at a rate of 5 kg/mt based on the eucalyptus layer.

A four-layer headbox was used to form the wet web with the BCTMP stock in the three outer forming fabric layers and the eucalyptus in the inner forming fabric layer of the headbox to produce the two-layered product described. The speed of the forming fabrics was 11.9 meters per second. The speed of the transfer fabric was 9.1 meters per second. The throughdrying fabric was traveling at a speed of about 9.1 meters per second. The web was carried over a Honeycomb throughdryer operating at a temperature of about 180° C.

Samples from Examples 1–3 and samples of commercially-available products were tested for Dispersibility and Wet Burst Strength. The results are set forth in TABLE 1 below:

TABLE 1

| Sample | Dispersibility | Wet Burst Strength |
|---|---|---|
| Example 1 | 65 | 122 |
| Example 2 | 82 | 112 |
| Example 3 | 34 | 175 |
| HUGGIES Baby Wipe 1K03558 (Tub Code) | 0 | — |
| HUGGIES Baby Wipe ML6151021 (Tub Code) | — | 443 |
| Scott Moist COTTONELLE 5 159 1M4 (Tub Code) | — | — |
| Scott Moist COTTOMELLE 5 272 1M4 (Tub Code) | — | 444 |
| Scott Quilted BABY FRESH 504437 (Tub Code) | 0 | — |
| Scott Quilted BABY FRESH 5353228 (Tub Code | — | 435 |
| BOUNTY Paper Towel | 0 | 357 |
| HI-DRI Paper Towel | 0 | 128 |

The results illustrate that only the wet wipes of this invention possess the combination of adequate Wet Burst Strength and Dispersibility.

It will be appreciated that the foregoing description and examples, given for purposes of illustration, are not to be construed as limiting the scope of this invention, which is defined by the following claims and all equivalents thereto.

We claim:

1. A water-dispersible wet wipe comprising at least two uncreped through-air-dried tissue sheets of papermaking fibers containing a wet strength agent and mechanically attached together along their edges by embossments sufficient to maintain the integrity of the wet wipe during use, said wipe having one or more centrally-located unembossed regions with an area of from about 1 to about 30 square inches, a moisture content of at least about 200 weight percent based on the dry weight of fiber, a Wet Burst Strength of about 100 grams or greater in the centrally-located unembossed regions, and a Dispersibility of from about 10 to 100 percent.

2. The wet wipe of claim 1 consisting of two uncreped through-air-dried sheets.

3. The wet wipe of claim 1 consisting of three uncreped through-air-dried sheets.

4. The wet wipe of claim 1 wherein the embossments comprise an embossing pattern of closely-spaced dots.

5. The wet wipe of claim 1 wherein the embossments substantially surround two large unembossed regions.

6. The wet wipe of claim 5 wherein each of the two large unembossed regions have an area of from about 5 to about 15 square inches.

7. The wet wipe of claim 5 wherein each of the two large unembossed regions have an area of about 10 square inches.

8. The wet wipe of claim 1 wherein the unembossed regions have a Wet Burst Strength of from about 100 to about 200 grams.

9. The wet wipe of claim 1 having a Dispersibility of from about 20 to about 100 percent.

10. The wet wipe of claim 1 having a Dispersibility of from about 40 to about 100 percent.

* * * * *